United States Patent [19]

Marks et al.

[11] Patent Number: 5,312,881
[45] Date of Patent: May 17, 1994

[54] METHOD FOR CATALYTIC POLYMERIZATION OF SUBSTITUTED ACRYLATES

[75] Inventors: Tobin J. Marks; Yoshihiro Yamamoto, both of Evanston, Ill.; Laurent Brard, Philadelphia, Pa.; Michael Giardello, Pasadena, Calif.

[73] Assignee: Northwestern University, Chicago, Ill.

[21] Appl. No.: 25,372

[22] Filed: Feb. 26, 1993

Related U.S. Application Data

[63] Continuation-in-part of Ser. No. 860,784, Mar. 31, 1992.

[51] Int. Cl.$^5$ .............................................. C08F 4/16
[52] U.S. Cl. ................................... 526/126; 526/128; 526/134; 526/160; 526/170; 526/185; 526/190; 526/328; 526/329.7; 526/303.1; 526/318.3
[58] Field of Search ............... 526/126, 128, 134, 160, 526/170, 185, 190

[56] References Cited

PUBLICATIONS

Pinazzi, et al, "Polymerization of Methylenecyclobutane, Synthesis of an Isopolyisoprene," Die Makromolekulare Chemie 122 (1969), pp. 105–122.

Takemoto, et al., "Vinylpolymerisation," Die Makromolekulare Chemie 109 (1967), pp. 81–86.

Rossi, et al., "On the Ring-Opening Polymerization of Methylenecyclobutane," Macromolecules, vol. 5, No. 3, (1972), pp. 247–249.

Pinazzi, et al., "Polymerisation du methyleneeyclobutane Obtention de l'isocaoutchouc," Die Makromolekulare Chemie 147 (1971), pp. 15–33.

Hiraguri, et al., "Radical Polymerization of 3-Substituted-1-Methylenecyclobutanes," Journal of Polymer Science, vol. 26 (1988), pp. 381–384.

Primary Examiner—Joseph L. Schofer
Assistant Examiner—N. Sarofim
Attorney, Agent, or Firm—Welsh & Katz, Ltd.

[57] ABSTRACT

The synthesis, and use as catalysts of chiral organolanthanide complexes for polymerization of substituted acrylates are disclosed, having the structure $[(C_5R'_{4-x}R^*_x)A(C_5R''_{4-y}R'''_y)MQ_p]^m$, where x and y represent the number of unsubstituted locations on the cyclopentadienyl ring; R', R", R"', and R* represent substituted and unsubstituted alkyl groups having 1–30 carbon atoms and R* is a chiral ligand; A is a fragment containing a Group 13, 14, 15, or 16 element of the Periodic Table; M is a Group 3, 4, 5, or lanthanide metal of the Periodic Table; and Q is a hydrocarbyl radical, aryl, hydrogen, amide radical, or halogen radical, with $3 \geq p \geq 0$; and m = 0 or +1.

13 Claims, 1 Drawing Sheet

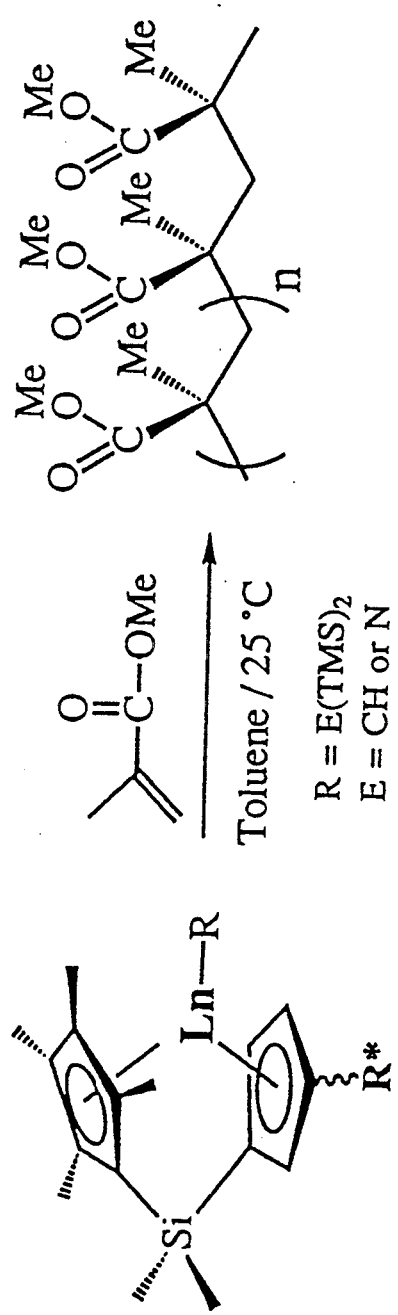

METHOD FOR CATALYTIC POLYMERIZATION OF SUBSTITUTED ACRYLATES

This invention was made with Government support under Grant No. CHE9104112 awarded by the National Science Foundation. The Government has certain rights in the invention.

This application is a continuation-in-part of Ser. No. 860,784, filed Mar. 31, 1992.

This invention relates to an improved method for using chiral catalyst system in the stereoregular polymerization of substituted acrylates.

BACKGROUND OF THE INVENTION

The polymerization and copolymerization of methylmethacrylate with a chiral organolanthanide catalysts, such as $Cp'_2LnR$ ($Cp' = C_5Me_5$, $R = CH_3$ or H and $Ln = Sm, Y, Lu$) yields a substantially syndiotactic polymethyl methacrylate. (H. Yasuda, et al, J. Am. Chem. Soc. 1992, 114, 4908-4910.) However, catalyst improvements would be of great practical importance if better control over stereoregularities from syndiotacticities to isotacticities could be obtained, the use of undesired excess of co-catalysts were eliminated, and molecular weight and molecular weight distribution could be controlled, and the isospecific polymer nature could be easily prepared and controlled.

As such, there is a need to control stereochemistry in a great many chemicals and polymers and chiral metal catalysts offer an efficient means to do this. The design of a chiral metal catalyst necessarily relies on the design of appropriate ligands which create an asymmetric environment about the metal center. Certain classes of organolanthanide catalysts which are highly active for a variety of reactive purposes are known and described in U.S. Pat. Nos. 4,668,773 and 4,801,666. Organolanthanide hydrides, $(Cp'_2LnH)_2$ and $(Me_2SiCp''_2LnH)_2$, ($Cp' = \eta_5-(CH_3)_5C_5$, $Cp'' = \eta_5-(CH_3)_4C_5$ are known to effectively and selectively catalyze a number of olefin transformations including hydrogenation, oligomerization/polymerization, and hydroamination. Heretofore it has not been known whether an appropriate coordination environment could be devised to effect lanthanide-centered asymmetric catalytic transformation and to obtain favorable characteristics, such as extremely rapid kinetics, large turnover capacity, and reactivity tunable with the specific chiral ligand used. The synthesis of stereoregular polymers has been reported with the use of chiral organs-group IV (Ti, Zr, Hf) catalysts having approximate $C_2$ symmetry. Such catalysts resulted in isospecific polymerization of α-olefins. Most of the ligands for these "$C_2$" catalysts are based upon indenyl or related cyclopentadienyl components, and are difficult and expensive to synthesize. In only a few cases are the isotacticities of the polymeric products at a useful level.

SUMMARY OF THE INVENTION

An object of the subject invention is the efficient method of polymerization of α-substituted acrylates which permit excellent control over stereoregularities, from syndiotacticity to isotacticity, of the resulting polymers.

A further object of the subject invention is an efficient method of polymerization of α-substituted acrylates which permit control over molecular weight and molecular weight distribution of the resulting polymers.

A still further object of the subject invention is an efficient method of polymerization of α-substituted acrylates which permits better control over the desired physical properties of the resulting polymers.

These and other objects of the subject invention are attained in the subject invention whereby a rigid chiral ligand template is arrayed in a $C_1$-symmetrical manner about the metal coordination sphere (B) as opposed to the "$C_2$" symmetrical array of (A) as normally observed.

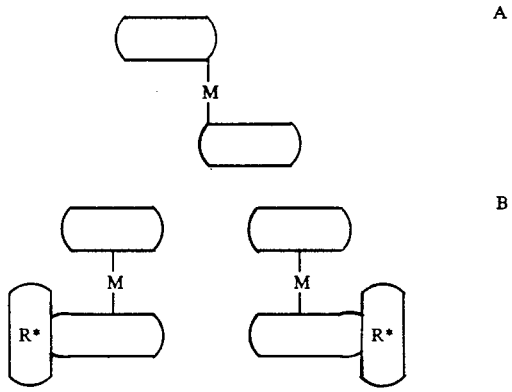

The R* group is a chiral ligand such as menthyl, neomenthyl, or phenylmenthyl which renders the two enantiomers of B diasteromeric and thus offers a means for separation. These chiral ligands in achiral organolanthanide catalyst complex are used in the polymerization of substituted acrylates.

DESCRIPTION OF THE DRAWING

The FIGURE is a schematic showing the polymerization reaction of the subject invention.

DETAILED DESCRIPTION OF THE INVENTION

In the practice of the subject invention as set forth in the FIGURE, a cyclopentadienyl compound (CpR*) having a chiral substituent such as menthyl or neomenthyl (R*) is refluxed with sodium hydride in a polar, high-boiling solvent such as THF, resulting in the sodium salt of the cyclopentadienyl compound, which is combined with $(CH_3)_2AClCp''$ ($Cp'' = C_5R_4$ where $R = $ an alkyl group ($C_1$-$C_{12}$), and preferably methyl) in a polar solvent such as DMSO, dimethyl ether, dimethyl formamide, or preferably THF to yield $(CH_3)_2AClCp''(CpR*)$. A is a bridging element or fragment containing an element as set forth below. This bridged chiral cyclopentadienyl compound is then reacted with a deprotonating agent such as $LiCH_2TMS$ in an organic non-polar, aprotic solvent under ambient temperature conditions. Then with $MX_4$ ($M = Tr, Zr$, or Hf and $X = Cl, Br$, or I. $MX_4$ is preferably $ZrCl_4$) or $MX_3$ ($M = $ lanthanide metals or yttrium, $MX_3$ is preferably $SmCl_3, NdCl_3, YCl_3$, or $LuCl_3$) in a polar solvent such as THF or dimethyl ether to yield $(CH_3)_2A(C_5R_4)C_5R*H_3MX_2$ ($M = Ti, Zr$, or Hf) or $(CH_3)_2A(C_5R_4)C_5R*H_3MX_2^-$ ($M = $ lanthanide metal or yttrium). The halogen may be replaced with alkyl groups ($C_1$-$C_{12}$, and preferably methyl for $M = Ti, Zr$, or Hf, and hydrogen, bis(trimethyl sily)carbyl or bis (trimethyl silyl)amide radical for $M = $ lanthanide metal or yttrium), by addition of an alkylating agent such as RLi, or RMgX in a nonpolar solvent. With or without the addition of a Lewis acid cocatalyst such as alumoxane or $B(C_6F_5)_3$, a substituted acrylate may be easily polymerized. A Brönsted acid may also be used as a cocatalyst. Suitable Brönsted acids which may be used have the formula $HY^+Z^-$ where $Y^+$ is a fragment containing a Group 15 or 16 element in the form $N(R^1R^2R^3)^+$ where $R^1$, $R^2$, and $R^3$ are alkyl groups ($C_1$-$C_{12}$) and $Z^-$ is a fragment containing a Group 13 element. Such acids may be $HN(CH_3)_3^+ B(C_6F_5)_4^-$; $HN((CH_3)_3^+ Al(C_6F_5)_4^-$ or $HP(CH_3)_3^+ B(C_6F_5)_4^{31}$.

The catalyst thus prepared may be defined as $[(C_5R'_{4-x}R^*_x) A (C_5R''_{4-y}R'''_y) M Q_p)]^m$, where x and y represent the number of unsubstituted locations on the cyclopentadienyl ring; R', R", R''', and R* represent alkyl groups having 1-30 carbon atoms R* is a chiral ligand and M=0 or +1; A is a Group 13, 14, 15, 16 element of the Periodic Table or element fragment and preferably Si; M is a Group 3, 4, or 5 and lanthide metals of the Periodic Table and preferably Group 3 and lanthanide metals; and Q is a hydrocarbyl, aryl, hydrogen, amide, radical, or halogen radical, with $3 \geq p \geq o$. In the alternative, Q could be a mixture of hydrocarbyl, aryl, hydrogen, amide radical, or halogen radicals; in such a case Q would become Q', Q" and possibly Q''', with p=2.

By changing the chiral ligand (R*), the physical properties of the resulting polymers can be adjusted as desired. By changing A, the solubility and other properties of the catalyst can be affected.

R* may in fact be any alkyl or aryl group which is optically active and $C \leq 30$. On a basic level R* may be

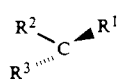

where $R^1$, $R^2$, and $R^3$ are $C \leq 20$ or H, $R^1 \neq R^2 \neq R^3$. More specifically, R* may be groups with neomenthyl, menthyl, or phenylmenthyl moieties.

R', R", and R''' may be hydrogen or a hydrocarbyl radical. Examples of hydrocarbyl radicals useful include alkyl, alkenyl, aryl, alkylaryl, arylalkyl radicals. More specifically, exemplary hydrocarbyl radicals include methyl, ethyl, n-propyl, isopropyl, butyl, tert-butyl, amyl, isoamyl, hexyl, isobutyl, heptyl, octyl, nonyl, decyl, cetyl, phenyl, methylene, ethylene, propylene, and other like groups.

A is a stable component such as an element or an element containing fragment that bridges the two $(C_5(R)_4)$ rings in order to render the catalyst stereo-rigid. The element in A may be from Groups 13, 14, 15, 16 of the Periodic Chart. Examples of A include fragments containing Si, Ge, S, C, Sn, Pb, B, Al, Ga, In, Tl, N, P, As, Sb, Bi, Se, and Te. The preferred A is $Si(CH_3)_2$, although the element may have alkyl or aryl groups where C=1-30.

Similarly, Q may be any of the hydrocarbyl groups listed for R above, and Q is a hydrogen, amide radical, and halogen, but preferably, Q is a hydrogen, hydrocarbyl, and amide radical, and most preferably, Q is a hydrogen, bis(trimethylsilyl)carbyl and bis(trimethylsilyl)amide radical. Also, in the preferred embodiment, p is 1.

The metallocene catalyst must be chiral and have non-$C_2$ based symmetry, i.e., non-superimposable on its mirror image, for the polymerization of substituted acrylates, in order to produce a useful polymer product.

It was discovered that chirality in a metallocene catalyst exhibits stereochemical control over the polymer product and produces a polymer with high stereospecificity. In addition, the catalyst should be stereo-rigid to aid in the stereochemical control of the polymerization.

The catalyst systems used in the present invention may also include a Lewis acid cocatalyst in combination with the metallocene catalysts. Preferably, the cocatalyst is an alumoxane represented by the general formula $(R-Al-O)_n$ for the cyclic form and $R(R-A-l-O-)_n$-$AlR_2$ for the linear form. R is an alkyl group with preferably 1-5 carbons and n is an integer preferably from 1 to about 20. Most preferably, R is a methyl group. An alternative is a triaryl borane compound such as $B(C_6F_5)_3$. Other alternatives are $AB(C_6F_5)_4$ where $A=HR_3N^+$ or $(C_5H_5)_3C^+$.

Monomers which may be polymerized by the catalyst complex of the subject invention may be termed α-substituted acrylates and may have a structure such as:

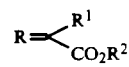

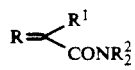

where R, $R^1$, and $R^2$ are alkyl or aryl groups ($C \leq 10$) or H.

Methyl methacrylate may be the most commonly known of such monomers.

DETAILED DESCRIPTION OF THE INVENTION

All operations were performed with rigorous exclusion of oxygen and moisture in flamed Schlenk-type glassware in a dual manifold Schlenk line or interfaced to a high vacuum ($10^{-5}$ torr) system, or in a nitrogen filled glovebox with a high capacity atmosphere recirculator. Argon gas was purified by passage through a supported MnO oxygen removal column and a molecular sieve column. Monomers were purified by fractional distillation and dried over $CaH_2$ and then distilled under high vacuum just before use. All reaction solvents were purified by standard method, dried over Na/K alloy, and vacuum transferred before use. Gel permeation chromatography (GPC) was performed on a WATERS ALC/GPC 150C chromatograph equipped with Shodex K-805L GPC column (50 cm × 2) using chloroform as an eluent. Molecular weights were calibrated against monodisperse methacrylate standards. Triad tacticities were calculated from $^1$H-NMR spectra recorded at ambient temperature in $CDCl_3$ at 300 MHz/40° C. on a Gemini 300 spectrometer. Pentad tacticities were calculated from $^{13}$C-NMR spectra recorded at 60° C. in toluene-d8 at 600 MHz/150° C. on a Bruker AMX 600 spectrometer.

In general, the polymerization reaction is carried out under inert atmosphere, such as argon, nitrogen, or the like. The catalyst as described above is mixed with the acrylate monomer in a nonpolar solvent, such as toluene, benzene, pentane, or other alkyl or aryl nonpolar solvent at a temperature from approximately −100° C. to approximately 100° C. and allowed to polymerize. If desired, quenching with a proton source (e.g. methanol) may be used to stop the reaction at desired conversion.

EXAMPLE 1

Preparation of Cp₂ Intermediates (CH₃)₂SiCp″H(+)CHNMCpH

A suspension of 7.76 g (36.15 mmol) Me₂SiClCp″ and 9.0 g (39.76 mmol) Na+(C₅H₅NM)⁻ (NM=(+)-neomenthyl) in 120 ml THF is stirred for 12 hours at ambient temperature. The solvent is then removed. The solution is then liberally extracted with 200 ml pentane, the mixture filtered, and the solvent removed in vacuo to give a quantitative yield of (CH₃)₂SiCp″HCHNMCpH as a clear colorless oil.

EXAMPLE 2

(CH₃)₂SiCp″H(−) (MCp)H

A suspension of 7.76 g (36.15 mmol) Me₂SiClCp″ and 9.0 g (39.16 mmol) Na+(C₅H₅M)⁻ (M=(−)-menthyl) in 120 ml THF is stirred for 12 hours at ambient temperature. The solution is then extracted with 200 ml pentane and the mixture is filtered. The solvent is removed in vacuo to give a quantitative yield (18.22 g) of (CH₃)₂SiCp″H(−)MCpH as a clear colorless oil.

EXAMPLE 3

Preparation of Chiral Li Intermediate (CH₃)₂SnCp″(+)NMCpLi₂

A suspension of (CH₃)₂SnClCp″ and Na+(C₅H₅NM)⁻ (1:1 mol ratio) in 120 ml THF is stirred for 12 hours at ambient temperature. Two equivalents of LiCH₂TMS is added and stirred in a pentane solution. The pentane is removed, the residue extracted, filtered, and the solvent is removed to yield (CH₃)₂SnCp″(+)NMCpLi₂.

EXAMPLE 4

(CH₃)₂GeCp″(+)NMCpLi₂

A suspension of (CH₃)₂GeClCp and Na+(C₅H₅NM)⁻ (1:1 mol ratio) in 120 ml THF is stirred for 12 hours at ambient temperature. LiCH₂TMS is added and stirred in a pentane solution. The pentane is removed, the residue extracted with THF, filtered, and the solvent is removed as in Example 3 to yield (CH₃)₂GeCp″(+)NMCpLi₂.

EXAMPLE 5

(CH₃)₂SiCp″(C₂H₅)CpLi₂

A suspension of (CH₃)₂SiClCp and Na+(C₅H₄C₂H₅)⁻ in 120 ml THF is stirred for 12 hours at ambient temperatures. LiCH₂TMS is added and stirred. The solvent is removed, the residue extracted, filtered, and the solvent removed as in Example 3 to yield (CH₃)₂SiCp″(C₂H₅)CpLi₂.

EXAMPLE 6

Synthesis of (CH₃)₂SiCp″(+)NMCpLi₂

To the reaction product of Example 1 is added 6.6 g LiCH₂TMS in 250 ml pentane at ambient temperature and the mixture is stirred for 24 hours. The solvent is removed in vacuo to yield 16.75 g of a microcrystalline solid.

EXAMPLE 7

Synthesis of (CH₃)₂SiCp″(−)NMCpLi₂

To the reaction product of Example 2 is added 6.6 g LiCH₂TMS in 250 ml pentane at ambient temperature and the mixture is stirred for 24 hours. The solvent is removed in vacuo to yield 16.75 g of a microcrystalline solid.

EXAMPLE 8

Preparation of Chiral Lanthanum Catalyst

Synthesis of (CH₃)₂Si(CH₃)₄C₅) [(+)NM C₅H₃]LaCl₂

(CH₃)₂SiCp″(+)NMCpLi₂ and LaCl₃ are combined in a 1:1 molar ratio in THF and stirred at 60° C. for 18 hours. Solvent is removed in vacuo and the chiral lanthanide dichloride is extracted with diethylether. Concentration and slow cooling of the resulting solution affords the organolanthanum complex as a microcrystalline solid.

EXAMPLE 9

Synthesis of (CH₃)₂Si(Cp″) [(+)NMCp]LaN(TMS)₂

Reaction of the above dichloride complex with sodium bis(trimethylsilyl)amide toluene affords the corresponding amide complex.

EXAMPLE 10

Synthesis of (CH₃)₂Si(CH₃)₄C₅) [(+)NM C₅H₃]YCl₂

(CH₃)₂SiCp″(+)NMCpLi₂ and YCl₃ are combined in a 1:1 molar ratio in THF and stirred at 60° C. for 18 hours. Solvent is removed in vacuo and the chiral lanthanide dichloride is extracted and diluted with diethylether. Concentration and slow cooling of the resulting solution affords the organo yttrium complex as a microcrystalline solid.

EXAMPLE 11

Synthesis of (CH₃)₂Si(Cp″) [(+)NMCp]YCH(TMS)₂

Reaction of the above dichloride complex with bis(-trimethylsilyl)methyl lithium in toluene affords the corresponding alkyl complex.

EXAMPLE 12

Methyl Methacrylate Polymerization

Under rigorously anaerobic conditions, a flask was charged with 14 mg (0.02 mmol) of (CH₃)₂Si(Cp″) [(+)NMCp]LaN(TMS)₂ and the flask reattached to the vacuum line. Next toluene (50 mL) was vacuum transferred onto the solid and the solution equilibrated at the desired reaction temperature. Under argon flush, methyl methacrylate (1.1 mL, 0.01 mol) was syringed into the well-stirred catalyst solution. The mixture was stirred for 10 hours at 25° C. and was quenched by the addition of 5 ml of acidified aqueous methanol. The mixture was poured into 300 ml of methanol to precipitate the polymer which was then collected by vacuum filtration, washed with methanol, and dried under high vacuum for 12 hours (29 yield). The polymer was determined to be poly methyl methacrylate by 1H-NMR. The tacticity and the molecular weight of the polymethyl methacrylate were determined by standard methods and are shown in Tables 1 and 2.

EXAMPLES 13-28

Using the procedure and materials of Example 10, the method of the subject invention was used to polymerize methyl methacrylate under different conditions and with different catalysts, and the results are set forth in Table 1 as Examples 13-28 and in Tables 2 and 3.

EXAMPLE 29

Synthesis of $\{(CH_3)_2Si(Cp'')[(+)-NMCp]YH\}_2$

The alkyl complex produced by Example 11 was dissolved in pentane under $H_2$ atmosphere with stirring. The corresponding hydride complex was precipitated from the solution, and was filtered.

EXAMPLE 30

Ethyl Methacrylate Polymerization

Under rigorously anaerobic conditions, a flask was charged with 1.2 ml of ethyl methacrylate and the flask reattached to the vacuum line. Next toluene (50 ml) was vacuum transferred onto the liquid and the solution equilibrated at 0° C. Under argon flush, toluene solution (50 ml) of the above hydride complex (10 mg) was syringed into the well-stirred monomer solution. The mixture was stirred for 100 hours at 0° C. and was quenched by the addition of 10 ml methanol. The mixture was poured into 800 ml of methanol to precipitate the polymer which was then collected by vacuum filtration, washed with methanol, and dried under high vacuum for 10 hours. The yield of polyethylmethacrylate was 96% with 87% (triad) isotacticity.

Table 3 shows the molecular weight of the resulting polymers and compares such data when utilizing the menthyl, neomenthyl, and phenylmenthyl ligands.

Polymerization activities and stereoselectivities are shown to be tunable with the lanthanide ion, reaction temperature, the chiral auxiliary, and the absolute configuration of complexes. Polymer isotacticities as high as 99% mmmm pented content are observed, with stereoregularity increasing with decreasing reaction temperature.

The samarium complexes in Examples 22-23 having as (−)-menthyl auxiliary were prepared as described in Example 1. Corresponding yttrium (Examples 18 and 28), lanthanum (Example 13), and neodymium (Examples 26 and 27) complexes were synthesized via reaction of the dilithium salts of the ligands with the corresponding metal chloride ($LnCl_3$, Ln=lanthanide metal), followed by reaction with $NaN(SrMe_3)_2$. Complexes having a (−)-phenylmenthyl auxiliary were also prepared by the similar procedure through the dichloro complexes which were synthesized via reaction of the corresponding lithium salts with metal chloride.

The results of methyl methacrylate polymerization using chiral organolanthanide complexes are shown in Table 1. It can be seen that the complexes having (+)-neomenthyl auxiliary lead to isotactic polymethyl methacrylates, though the complexes having (−)-menthyl auxiliary lead to syndiotactic compounds. Stereoselectivities increase with decreasing temperature, and 96% (triad by $H^1$-NMR) and 99% (pentad by $C^{13}$-NMR, FIG. 1) isotacticity are achieved by reaction with $Me_2SiCp''[(−)NMCp]LaN(TMS)_2$ at 78° C., though only 75% (triad) and 62% (pentad) isotacticity can be obtained at 0° C. (R)-isomers give greater stereoselectivities than (S)-isomers (entries 10–14), and larger metal complexes tend to be isotactic (entries 32–35).

These results show that organolanthanide coordination geometries can be constructed that effect stereospecific polymerization of methylmethacrylate with relatively high stereoselectivities.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

TABLE 1

| Example | Chiral Auxiliary | Configuration | R | Ln | Temp (°C.) | Time (Hrs) | Yield (%) | mm (%) | mr (%) | rr (%) |
|---|---|---|---|---|---|---|---|---|---|---|
| 13 | (+)-Neomenthyl | | | | | | | | | |
|    | " | 6/1 R/S | N(TMS)$_2$ | La | 25 | 10 | 29 | 79 | 16 | 5 |
| 14 | " | " | " | " | 0 | 160 | 36 | 75 | 19 | 6 |
| 15 | " | " | " | " | −20 | 160 | | 81 | 14 | 5 |
| 16 | " | " | " | " | −35 | 160 | | 94 | 5 | 1 |
| 17 | " | " | " | " | −78 | 160 | <5 | 96 | 2 | 2 |
| 18 | " | 1/1 R/S | CH(TMS)$_2$ | Y | 25 | 10 | 100 | 55 | 25 | 20 |
| 19 | " | " | " | " | −20 | 160 | 100 | 64 | 20 | 16 |
| 20 | " | " | " | " | −35 | 160 | 100 | 62 | 22 | 17 |
| 21 | " | " | " | " | −78 | 160 | <5 | 75 | 15 | 10 |
| 22 | (−)-Menthyl | 3/7 R/S | CH(TMS)$_2$ | Sm | 0 | 3 | 100 | 14 | 18 | 69 |
| 23 | " | R | " | " | 25 | 10 | 96 | 13 | 20 | 67 |
| 24 | " | S | N(TMS)$_2$ | Lu | 25 | 12 | 59 | 20 | 23 | 57 |
| 25 | " | R | " | " | 25 | 20 | 25 | 10 | 17 | 73 |
| 26 | (−)-8-Phenyl-menthyl | 1/7 R/S | N(TMS)$_2$ | Nd | 25 | 10 | <5 | 82 | 8 | 10 |
| 27 | " | S | " | " | 25 | 66 | <5 | 69 | 12 | 19 |
| 28 | " | 3/7 R/S | N(TMS)$_2$ | Y | 25 | 10 | 100 | 4 | 24 | 72 | mm = isotactic − Triad
mr = atactic − Triad
rr = syndiatactic − Triad

TABLE 2

| No. | Catalyst | Temp (°C.) | Hrs | Yield (%) | mm (iso) (%) | mr (%) | rr (syn) (%) | mmmm (%) | mmmr (%) | rmmr (%) | mmrm (%) | mrmm (%) |
|---|---|---|---|---|---|---|---|---|---|---|---|---|
| 13 | Me₂SiCp''[(−)NMCp]LaN(TMS)₂ | 25 | | 29 | 78.9 | 16.3 | 4.8 | | | | | |
| 14 | Me₂SiCp''[(−)NMCp]LaN(TMS)₂ | 0 | | 36 | 75.2 | 18.9 | 5.9 | 61.7 | 5.3 | 6.3 | 4.2 | 1.9 |
| 15 | Me₂SiCp''[(−)NMCp]LaN(TMS)₂ | −20 | | — | 80.7 | 14.4 | 4.9 | | | | | |
| 16 | Me₂SiCp''[(−)NMCp]LaN(TMS)₂ | −35 | | — | 93.8 | 5.0 | 1.2 | 98.8 | 0.3 | 0.5 | 0.2 | 0.2 |
| 17 | Me₂SiCp''[(−)NMCp]LaN(TMS)₂ | −78 | | <5 | 95.6 | 2.0 | 2.3 | | | | | |

TABLE 3

| No. | Catalyst | R/S | Temp (°C.) | Hrs | Yield (%) | mm (%) | mr (%) | rr (%) | Mw *1000 | Mn *1000 | Mw/Mn | Peak M *1000 |
|---|---|---|---|---|---|---|---|---|---|---|---|---|
| (−) Menthyl Ligand | | | | | | | | | | | | |
| 22 | Me₂SiCp''[(−)MCp]SmCH(TMS)₂ | 3.7 | 25 | 3 | 100 | 13.6 | 17.8 | 68.5 | 345 | 177 | 1.95 | 306 |
| 23 | Me₂SiCp''[(−)MCp]SmCH(TMS)₂ | 1/0 | 25 | 10 | 96 | 12.6 | 20.2 | 67.2 | 451 | 150 | 3.01 | 510 |
| 24 | Me₂SiCp''[(−)MCp]LuN(TMS)₂ | 0/1 | 25 | 12 | 59 | 20.4 | 22.8 | 56.8 | 725 | 394 | 1.84 | 686 |
| 25 | Me₂SiCp''[(−)MCp]LuN(TMS)₂ | 1/0 | 25 | 20 | 24 | 9.8 | 17.0 | 73.3 | 1330 | 85 | 15.70 | 2170 |
| (+) Neomenthyl Ligand | | | | | | | | | | | | |
| 13 | Me₂SiCP ''(+)NMCp]LaN(TMS)₂ | 6/1 | 25 | 10 | 29 | 78.9 | 16.3 | 4.8 | 191 | 38 | 4.07 | 65.1 |
| 18 | Me₂SiCP ''(+)NMCp]YCN(TMS)₂ | 1/1 | 25 | 12 | 100 | 54.6 | 25.3 | 20.1 | 423 | 236 | 1.79 | 396 |
| (−) Phenylmenthyl Ligand | | | | | | | | | | | | |
| 26 | Me₂SiCp''[(−)PhMCp]NdN(TMS)₂ | 1/7 | 25 | 10 | <5 | 82.1 | 8.3 | 9.6 | — | — | — | — |
| 27 | Me₂SiCp''[(−)PhMCp]NdN(TMS)₂ | 0/1 | 25 | 66 | <5 | 69.0 | 12.1 | 19.0 | — | — | — | — |
| 28 | Me₂SiCp''[(−)PhMCp]YN(TMS)₂ | 3/7 | 25 | 10 | 100 | 3.8 | 23.9 | 72.3 | 1230 | 466 | 2.64 | 1540 |

We claim:

1. A method for polymerizing α-substituted acrylates, including the steps of
   1) placing a catalyst in a vessel, said catalyst having the formula:

$(C_5R'_{4-x}H_xR^*) A (C_5R''_{4-y}H_yR''') M Q_p$ where x and y represent the number of unsubstituted locations on the cyclopentadienyl ring; R', R'', R''', and R* represent substituted and unsubstituted alkyl groups having 1-30 carbon atoms, R* having a chiral substituent; A comprises a Group 13, 14, 15, 16 element of the Periodic Table; M is a Group 3, 4, 5 metal of the Periodic Table or lanthanide metal; and Q is a hydrocarbyl radical, aryl, halogen radical, hydrogen or amide radical with $3 \geq p \geq 0$ and m=o or +1;
   2) placing an α-substituted acrylate in said vessel;
   3) allowing the polymerization reaction to proceed; and
   4) quenching the reaction at desired conversion stage.

2. The method of claim 1 wherein R* represents an alkyl group or aryl group which is optically active.

3. The method of claim 1 wherein R* is the formula

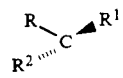

where $R^1$, $R^2$, $R^3$ are $C \leq 20$ or H, and $R^1 \neq R^2 \neq R^3$.

4. The method of claim 1 wherein R* is (+)-neomenthyl, (−)-menthyl, or (−)-phenylmenthyl group.

5. The method of claim 1 wherein A is Si(CH₃)₂.

6. The method of claim 1 wherein R'' and R''' are methyl groups.

7. The method of claim 1 wherein M is group 3 or lanthanide metal in the Periodic Table.

8. The method of claim 1 wherein M is Y, La, Nd, Sm, or Lu.

9. The method of claim 1 wherein Q is a hydrogen, methyl bis(trimethylsilyl)methyl, or bis(trimethylsilyl)amide.

10. The method of claim 1 wherein said α-substituted acrylates are selected from the group consisting of:

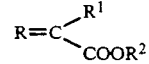

and

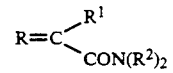

where R, $R^1$, and $R^2$ are alkyl or aryl groups ($C \leq 10$) or H.

11. The method of claim 1 wherein said α-substituted acrylates are methacrylate esters.

12. The method of claim 1 wherein the polymerization reaction is proceeded in a non polar solvent.

13. The method of claim 1 wherein a cocatalyst of the formula B(C₆H₆)₃; AB(C₆F₅)₄ where A=HR₃N or (C₆H₅)₃C⁺ or methyl alumoxane is added to said vessel.

* * * * *